United States Patent [19]

Hughes

[11] Patent Number: 5,063,768

[45] Date of Patent: Nov. 12, 1991

[54] SPRING-LOADED TEETH FOR COMMINUTER ROLLS

[75] Inventor: John H. Hughes, Montesano, Wash.

[73] Assignee: ComCorp, Inc., Montesano, Wash.

[21] Appl. No.: 602,742

[22] Filed: Oct. 24, 1990

Related U.S. Application Data

[62] Division of Ser. No. 298,454, Jan. 18, 1989.

[51] Int. Cl.[5] ...................... B02C 18/18; B21D 37/00; B21K 21/12; B23P 13/04

[52] U.S. Cl. .................................... 72/379.2; 72/324; 76/101.1; 76/108.1; 29/557

[58] Field of Search ................. 72/129, 146, 148, 274, 72/340, 379.2, 324, 51, 52; 76/101.1, 108.1, 116, 118; 29/557, DIG. 41

[56] References Cited

U.S. PATENT DOCUMENTS

| | | | |
|---|---|---|---|
| 263,162 | 8/1882 | Gerald | 76/118 |
| 1,933,559 | 11/1933 | Kovar | 76/101.1 |
| 2,459,568 | 1/1949 | Lyon | 72/146 |
| 2,846,902 | 8/1958 | Cowley | 72/379.2 |
| 2,944,549 | 7/1960 | Alexander | 72/379.2 |
| 3,136,202 | 6/1964 | Wagner | 72/146 |
| 3,173,200 | 3/1965 | Dunmire et al. | 72/339 |
| 4,056,961 | 11/1977 | Jamison | 72/148 |

FOREIGN PATENT DOCUMENTS

| | | | |
|---|---|---|---|
| 14228 | of 1901 | United Kingdom | 76/118 |
| 484056 | 4/1938 | United Kingdom | 72/146 |

*Primary Examiner*—Robert L. Spruill

*Attorney, Agent, or Firm*—Christensen, O'Connor, Johnson & Kindness

[57] ABSTRACT

A tooth for use in a comminuter roll comprises a roll of spring steel having a first end formed into a point or other abrading shape. The tooth is compressed upon insertion into a mounting hole in the roll and the inherent spring of the steel tends to force the tooth back to its original size, thereby creating forces on the interior of the mounting hole to form an interference fit that holds the tooth in place in the mounting hole. In a preferred embodiment, the tooth is formed of a roll of spring steel having a G-shaped cross section. This shape provides an opening through the length of the tooth and also leaves a solid piece in the center of the tooth to aid in tooth removal. A rod can be slipped through the lengthwise opening of the first tooth so that its end abuts the solid center portion of the second tooth that is colinearly mounted in the other end of the hole that the first tooth is mounted in. Tapping the rod will force the second tooth out of its hole without disturbing the first tooth. The steel piece can be cut either before or after rolling to form suitable abrading ends on the teeth and a back end of the tooth can be chamfered to make the tooth easier to insert in the hole of the roll.

6 Claims, 2 Drawing Sheets

Fig. 1.
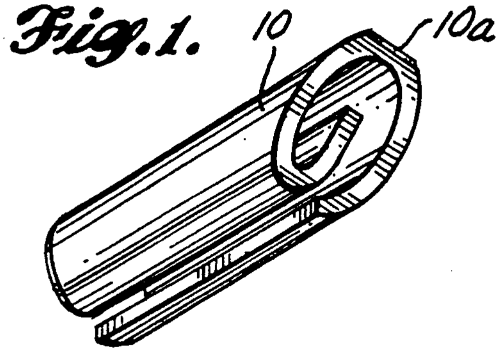
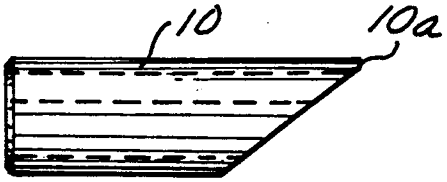
Fig. 2.
Fig. 3.
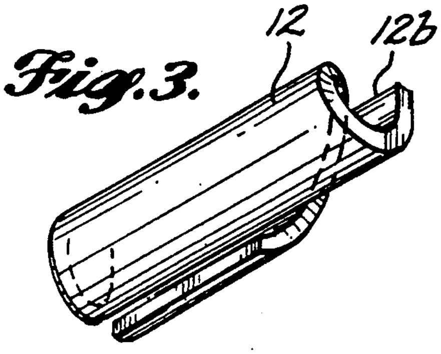
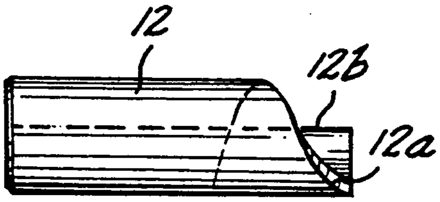
Fig. 4.
Fig. 5.
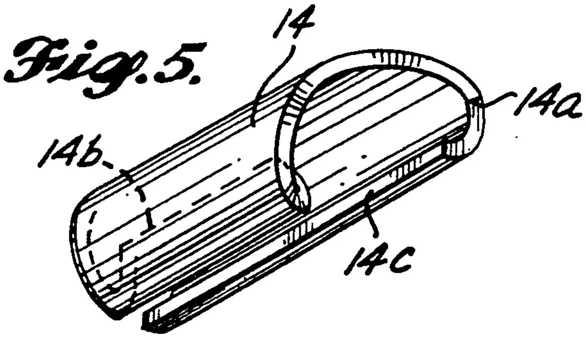
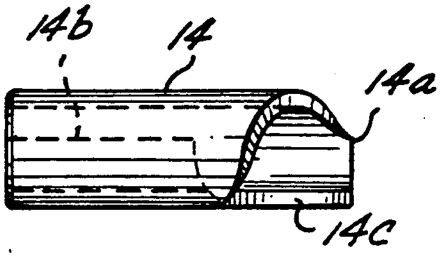
Fig. 6.
Fig. 7.
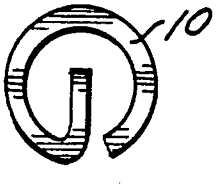

Fig. 8.
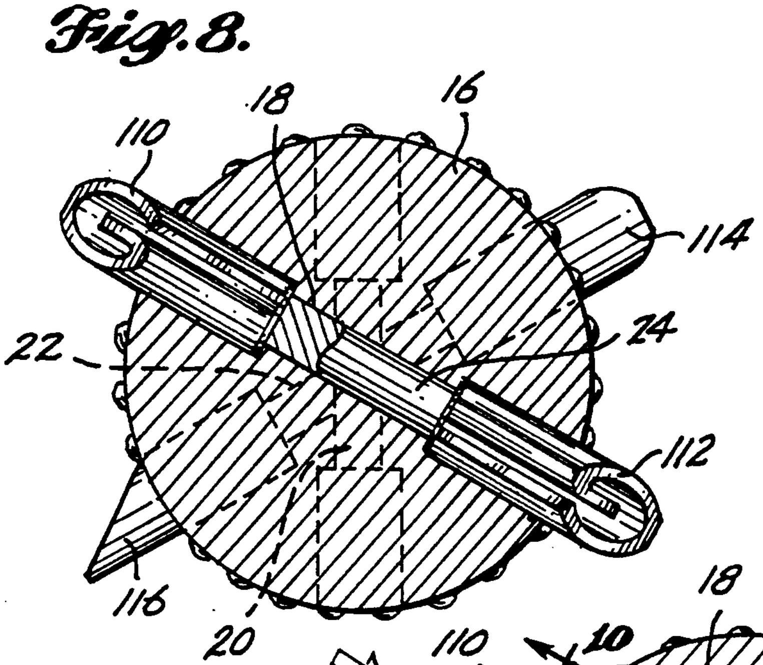
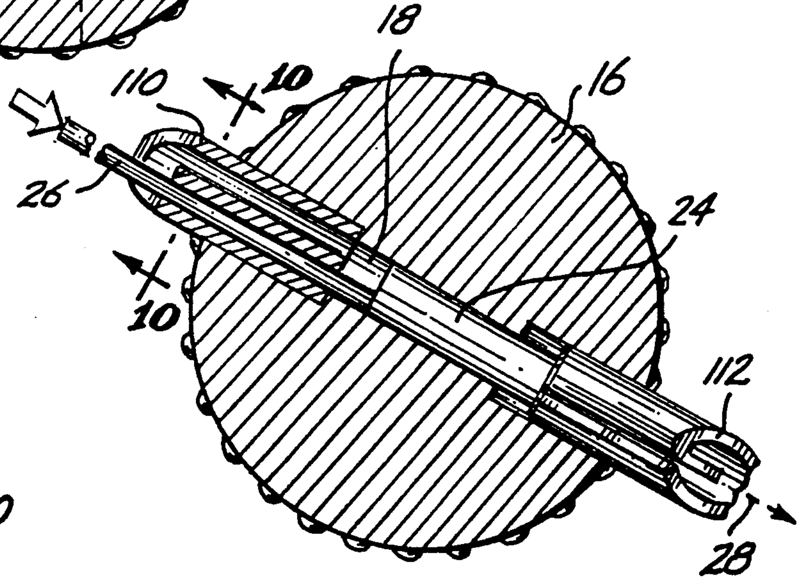
Fig. 9.
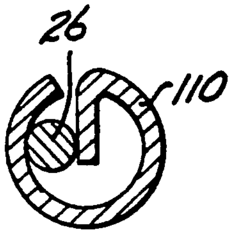
Fig. 10.

SPRING-LOADED TEETH FOR COMMINUTER ROLLS

This is a divisional of the prior application Ser. No. 298,454, filed Jan. 18, 1989, the benefit of the filing dates of which are hereby claimed under 35 U.S.C. §120.

BACKGROUND OF THE INVENTION

This invention relates to comminuters for pulverizing solid material and, more particularly relates to an improved spring-loaded tooth for mounting in the comminuter rolls.

Comminuters can be used to pulverize a wide array of solid materials. A typical comminuter using pulverizing rollers is shown in U.S. Pat. Nos. 4,366,928, issued Jan. 4, 1983, and U.S. Pat. No. 4,477,028, issued Oct. 16, 1984, to John H. Hughes. In both these prior art comminuters the rollers are arranged in an upright position and form a comminuting chamber. The roller arrangement is mounted within a housing of some type that surrounds the array of rollers. The material to be broken down is fed into the top of the comminuting chamber and driven orbitally at a speed sufficient to be forced against the comminuting rollers. Puncturing elements, or teeth, are present on the external surfaces of the rollers to break the material into smaller pieces by both an abrading and puncturing action. The pieces then fall to the bottom of the chamber and exit the chamber through some screening and exit arrangement formed at the bottom of the comminuting chamber. Typically, the exit from the comminuting chamber is formed around the outer perimeter of the base of the housing.

In earlier comminuters the teeth on the rollers were either formed directly as a part of the roller or were welded to the roller so that when the teeth dulled and needed to be repaired or replaced the entire roller had to be removed from the comminuter and either a new roller or refurbished roller put in its place. In another embodiment of a comminuter, holes can be drilled in the comminuting rolls to accommodate individually mounted teeth. Typically, the hole is threaded or the hole is sleeved with a threaded insert. The tooth can be mounted on a threaded stud that cooperatively engages the threaded hole in the roll. While these individually mounted teeth are arguably an improvement over the earlier comminuter rolls, removal and replacement of the teeth still involves unthreading the teeth from the roll, which is a time-consuming job, considering the number of rolls and number of teeth per roll in a large comminuter. Also, the threaded teeth are more costly to produce, as are the threaded holes in the roll. Finally, the comminuter rolls are subject to a great amount of abuse since many types of material, including metals and stone, are crushed by the comminuter and it would be likely for threads to be damaged in the holes for accepting the teeth or the teeth to be broken off of the threaded studs, making removal and replacement more difficult.

It is, therefore an object of the present invention to provide a spring-loaded tooth for a comminuter roll that is easy to install and to remove and that is relatively simple to produce.

SUMMARY OF THE INVENTION

A tooth for use in a comminuter roll comprises a roll of spring steel having a first end shaped into an abrading point. In one embodiment, the tooth has a linear section in the center thereof and a wrap of spring steel substantially surrounding the linear portion to form a G-shaped cross section. Preferably, the second end of the tooth is chamfered to permit ease of insertion into a mounting hole.

A comminuting roll having the teeth installed includes a plurality of holes formed in the surface of the roll. The diameter of the holes is slightly smaller than the outer diameter of the tooth so that, upon insertion, the tooth is compressed and the inherent spring strength of the tooth, attempting to return to its original size, produces a force on the interior surface of the hole and forms an interference fit that holds the tooth in the roll. The abrading ends of the tooth can be cut at an acute angle to form an angled point or, alternatively, a portion of the spring steel plate can be removed prior to rolling to form an abrading edge.

A method of forming the tooth includes bending a rectangular piece of spring steel at a 90-degree bend and rolling the remaining portion of the sheet about the 90-degree bent portion to form a roll of the sheet material having a cross section of substantially the shape of the letter "G". Prior to bending, a right or left corner of the rectangle of steel can be removed so that, upon bending, the end of the tooth corresponding to the removed corner will form an abrading end of the tooth.

BRIEF DESCRIPTION OF THE DRAWINGS

The objects and advantages of the present invention will be better understood of those of ordinary skill in the art and others, upon reading the ensuing specification, when taken in conjunction with the appended drawings wherein:

FIG. 1 is an isometric view of one embodiment of a comminuter roll tooth made in accordance with the principles of the present invention;

FIG. 2 is a side elevational view of the tooth of FIG. 1;

FIG. 3 is an isometric view of a second embodiment of a tooth made in accordance with the principles of the present invention;

FIG. 4 is a side elevational view of the tooth of FIG. 3;

FIG. 5 is an isometric view of a third embodiment of a tooth made in accordance with the principles of the present invention;

FIG. 6 is a side elevational view of the tooth of FIG. 5;

FIG. 7 is a cross-sectional view of any of the teeth shown in FIGS. 1, 3, or 5;

FIG. 8 is a plan view in section of a comminuter roll having teeth made in accordance with the principles of the present invention installed therein;

FIG. 9 is a cross-sectional view of a comminuter roll showing a method of removing a tooth of the type shown in FIG. 8; and, FIG. 10 is a cross-sectional view of the tooth shown in FIG. 9 with the removal rod placed through it.

DETAILED DESCRIPTION OF THE PREFERRED EMBODIMENTS

Three different embodiments of a tooth for use in a comminuter roll are shown in FIGS. 1 through 6. Each of the teeth has in common the fact that they are essentially of a G-shaped cross section, as shown in FIG. 7. Each of the teeth is comprised of a roll of spring steel and the second end of each tooth is chamfered to ease the insertion of the tooth into the hole in the comminuting roll.

FIG. 8 shows a tooth of the type shown in FIG. 1 inserted into holes formed in a comminuting roll. The hole is preferably of a diameter slightly smaller than the diameter of the tooth so that the tooth must be compressed when it is driven into the hole. Since the tooth is comprised of a spring steel material, there is a tendency inherent in the tooth to attempt to spring back to its original size. This tendency creates a force on the interior surface of the hole that holds the tooth in place.

A variety of abrasive ends can be formed on the teeth and three examples of end shapes for the tooth of the present invention are shown in FIGS. 1 through 6. These illustrated embodiments are not meant to be limiting, and often end shapes can be formed and are suitable for the comminuting function. FIGS. 1 and 2 show a tooth 10 formed by curling a rectangular piece of spring steel into a cylindrical shape so that the tooth has a G-shaped cross section as shown in FIG. 7. After the rectangular steel sheet is rolled an angular cut is made to produce the pointed end 10*a* that can best be seen in FIG. 2. The angle of the cut necessary to make the point is a matter of choice with the user and is determined by the cut that gives the best comminuting action balanced with the durability of the tooth.

The tooth 12 shown in FIGS. 3 and 4 is also formed of a rectangular sheet of spring steel that has been rolled into a cylindrical shape. In forming the tooth 12, one corner of the sheet is cut off prior to rolling the sheet into its cylindrical shape. After the corner is removed from the sheet, the longer edge 12*b* of the sheet is bent substantially 90 degrees from the rest of the sheet. The remainder of the sheet is then wrapped around the 90-degree bend portion to form substantially a cylindrical shape. Once, again, the tooth has a substantially G-shaped cross section as shown in FIG. 7 but presents a distinct end 12*a* for use in the abrasive process.

The tooth 14 shown in FIGS. 5 and 6 is, like the two previous teeth, formed of a rolled rectangular piece of spring steel. However, in the tooth 14, after a corner is removed from the sheet as in the formation of the tooth 12, the shorter edge 14*b* of the sheet is bent 90 degrees of the sheet and then the remainder of the sheet, beginning with the longer edge 14*c*, is wrapped in a cylindrical fashion around the bent portion to form a substantially cylindrical body. This provides another distinct end shape of the end 14*a* of the tooth for presentation to the material being abraded or reduced.

Other end shapes can be utilized in the teeth made in accordance with the principles of the present invention and the tooth that works best in a given situation is determined primarily by empirical methods. While it has been found that the tooth 10 is suitable for most applications, it may be that other materials are being reduced in the comminuter that require the shapes of the teeth 12 and 14 or even other shapes, such as a double-pointed tooth.

FIG. 8 shows in cross section a typical installation of teeth made in accordance with the principles of the present invention installed in a comminuting roll. The comminuting roll 16 has a plurality of holes 18, 20, and 22 drilled through the roll along diameters of the roll. The holes 18, 20, and 22 are angularly offset from one another and, also, offset along the length of the roll 16 so that, as shown, for example, in FIG. 8, the hole 18 is located above the hole 20, which, in turn, is located above the hole 22. The hole 18 has its opposing ends countersunk some predetermined distance from the surface of the roll to a size sufficient to accept teeth 110 and 112. As was discussed earlier, the diameter of the countersunk portion of the hole 18 is slightly smaller than the diameter of the teeth 110 and 112 so that the teeth 110 and 112 must be press-fit into the countersunk portions. The shoulder formed at the transition of the countersunk portion of the hole 18 to the smaller diameter portion of the hole forms a stop for the back end of the teeth 110 and 112 as they are press-fit into the countersunk portions of the hole. Typically, teeth are placed in alternate levels of the holes in the roll. For example, in the illustrated embodiment of FIG. 8, there are teeth 110 and 112 in each end of the hole 18, no teeth in the hole 20, and then teeth 114 and 116 placed, again, in the opposite ends of the hole 22. The empty hole 20 serves to assist in removal of the comminuted material from the comminuting chamber by allowing the material to be packed into the hole and then slung from the hole as the roll rotates in the machine. The teeth are placed in the roll in random orientation so that the angled ends of the teeth protruding from the roll are in a variety of orientations as they present themselves to the material to be comminuted. It has been found that a random orientation of the cutting points of the teeth is desirable to achieve an efficient comminuting action. If the end points of all the teeth are in the same orientation, there is a tendency to groove the material being comminuted rather than tear it into particles.

FIG. 9 shows the removal of the tooth 112 from the comminuting roll 16. A slug 24 is placed into the central portion of the hole 18 between the two countersunk ends of the hole. When it is desired to remove the tooth 112, a rod 26 is placed through the tooth 110 to impinge on the slug 24. The rod 26 can then be tapped with a hammer and will force the slug 24 out of its position, pushing with it the tooth 112 as shown by the arrow 28. FIG. 10 is a cross section of the tooth 110 shown in FIG. 9 with the rod 26 inserted in the tooth 110. Once the slug 24 and the tooth 112 are removed from one side of the hole 18, a rod can then be inserted into the hole 18 from the opposing end and the tooth 110 tapped out if desired. In this way it is convenient and relatively simple to remove individual ones of the teeth for replacement or repair without the need to remove the entire roll or even to remove opposing teeth on any given layer of the roll.

A spring-loaded tooth for use in the rolls of a comminuter has been described and illustrated. The person of ordinary skill in the art will realize that, while a preferred embodiment of the tooth has been described and illustrated, changes can be made to the illustrated embodiments while remaining within the scope of the present invention. For example, varying end shapes can be formed other than those illustrated herein and, while the teeth have been shown inserted in a roll in combination with a plurality of open holes in the surface of the roll, teeth could be used to completely cover the roll without the use of the open holes for product removal. Since changes can be made to the illustrated and described embodiments of the invention, the invention should be defined solely with reference to the appended claims.

The embodiments of the invention in which an exclusive property or privilege is claimed are defined as follows:

1. A method of forming a tooth for a comminuter roll, said tooth having a point for comminuting solids, the method including the steps of rolling a sheet of spring steel to a substantially cylindrical shape and forming one end of said rolled spring steel into said point.

2. The method of claim 1, wherein the point-forming step is accomplished by cutting the end of the rolled spring steel at an acute angle.

3. The method of forming a comminuter tooth from a piece of spring steel, said piece having two parallel longitudinal edges and a distal edge orthogonal to both said longitudinal edges, said longitudinal edges and said distal edge defining a right rectangular distal end, the method including the steps of:

cutting one corner from the distal end of said piece of spring steel, such that one said longitudinal edge is shorter than the other longitudinal edge;

bending said shorter longitudinal edge 90 degrees to the plane of the piece of sheet steel and wrapping the remaining portion of the piece of steel around the 90-degree bent edge to form substantially a cylindrical shape, having a substantially G-shaped cross section.

4. A method of forming a tooth for a comminuter roll from a piece of spring steel, said piece having two parallel longitudinal edges and a distal edge orthogonal to both said longitudinal edges, said longitudinal edges and said distal edge defining a right rectangular distal end, the method including the steps of:

cutting a corner from the distal end of said piece of sheet steel, such that one said longitudinal edge is shorter than the other longitudinal edge; and bending said longer longitudinal edge 90 degrees to the remainder of the rectangular piece of sheet steel and wrapping the remaining portion of the piece of spring steel around the 90-degree bent portion to form a substantially cylindrical shape having a G-shaped cross section.

5. A method of forming a tooth for a comminuter roll, including the steps of rolling a sheet of spring steel to a substantially G-shaped cross section and forming one end of said rolled spring steel into a point.

6. The method of claim 5, wherein the point-forming step is accomplished by cutting the end of the rolled spring steel at an acute angle.

* * * * *